United States Patent [19]
Saka et al.

[11] Patent Number: 5,826,473
[45] Date of Patent: Oct. 27, 1998

[54] DEVICE FOR CUTTING A WIRE LAID ON A SUBSTRATE

[75] Inventors: Yuuji Saka; Nori Inoue; Takahiro Onizuka; Yoshito Oka; Hideo Matsuoka, all of Yokkaichi, Japan

[73] Assignee: Sumitomo Wiring Systems, Ltd., Japan

[21] Appl. No.: 707,030

[22] Filed: Sep. 3, 1996

[30] Foreign Application Priority Data

Aug. 31, 1995 [JP] Japan ................................ 7-223684

[51] Int. Cl.⁶ ..................................................... B26D 7/06
[52] U.S. Cl. ............................ 83/100; 83/923; 83/929.2; 30/180; 30/182
[58] Field of Search .................. 83/100, 923, 929.2; 30/180, 182

[56] References Cited

U.S. PATENT DOCUMENTS

| | | | |
|---|---|---|---|
| 596,066 | 12/1897 | Helwig | 30/180 |
| 1,373,861 | 4/1921 | Briles | 30/182 X |
| 1,385,481 | 7/1921 | Williams | 30/182 X |
| 1,592,017 | 7/1926 | Van Campen | 30/180 |
| 4,125,136 | 11/1978 | Olcese et al. | 83/929.2 X |
| 4,360,043 | 11/1982 | Maeda et al. | 83/929.2 X |
| 5,058,272 | 10/1991 | Steube | 30/180 X |
| 5,072,638 | 12/1991 | Huser | 83/100 X |

FOREIGN PATENT DOCUMENTS

| | | |
|---|---|---|
| 720255 | 7/1996 | European Pat. Off. . |
| 2263022 | 7/1993 | United Kingdom . |
| 2264885 | 9/1993 | United Kingdom . |

OTHER PUBLICATIONS

Patent Abstracts of Japan, 05227631, Sep. 3, 1993 (1 pg.) Tatsumi.

*Primary Examiner*—Maurina T. Rachuba
*Attorney, Agent, or Firm*—Jordan B. Bierman; Bierman, Muserlian and Lucas

[57] ABSTRACT

A continuous strand of wire is laid in a wire groove or between pairs of guides on a substrate and is cut at desired locations to form individual circuits. At least one recess below the level of the wire laying plane is positioned to correspond to a scrap wire portion to be cut off. The recess is wide enough to allow insertion of cutters. The cutters include pairs of first and second cutting blades located at opposite sides of the wire which are moved toward the wire so that both ends of the scrap wire portion are cut by the first cutting blades and by the second cutting blades, respectively.

4 Claims, 3 Drawing Sheets

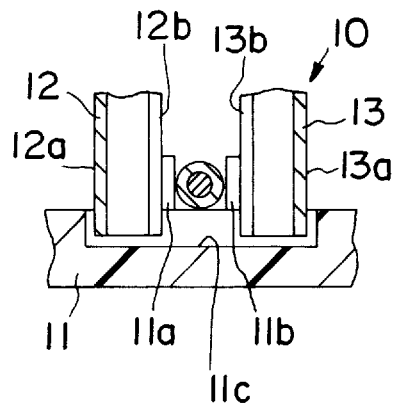
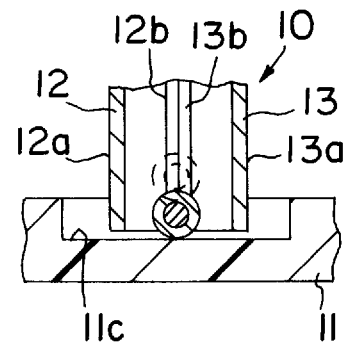
F I G. 2(A)  F I G. 2(B)
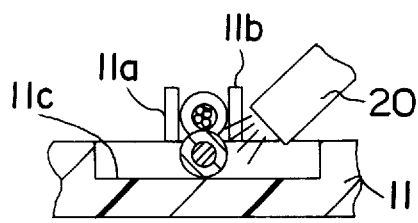
F I G. 2(C)
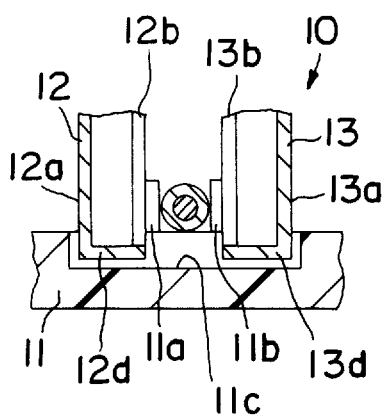
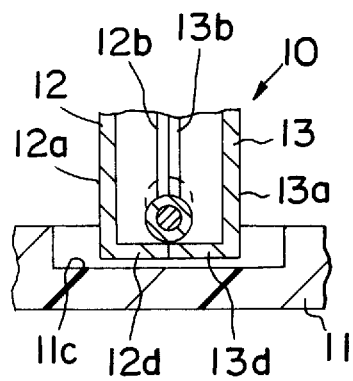
F I G. 3(A)  F I G. 3(B)

DEVICE FOR CUTTING A WIRE LAID ON A SUBSTRATE

This Application claims the benefit of the priority of Japanese Application 7-223,684, filed Aug. 31, 1995.

The present Invention relates to a device for cutting a wire which has been laid on an insulation substrate. It finds particular application in forming individual circuits from a continuous wire in an electrical connection box of an automotive vehicle. More specifically, it is useful in an electrical connection box wherein internal circuits are formed by a wire and cramping terminals, the continuous strand of wire is to be cut while on the substrate, and the cut wire portion is to be easily removed.

BACKGROUND OF THE INVENTION

In order to have the flexibility to easily respond to design changes of circuitry in an electrical connection box for use in an automobile, it has been the practice to form the circuits by wires and cramping terminals, rather than by busbars punched out of conductive metal plate. The cramping terminals connect the wires to external output terminals and also to each other.

One method for laying and cutting a wire used to form the circuit is described in JP-A-5-260629. After a continuous strand of wire is laid from a starting point to an end point, a cutting blade is moved downwardly to cut the wire, thereby forming separate circuits. According to another method, the wire is laid while being cut for each circuit.

According to the former prior art method, scrap wire portions W', indicated by hatched portions in FIG. 5 are removed by cutting their opposite ends P1, P2. However, if the wire is laid directly on the substrate, scrap wire portions W' will remain on the surface since the plane of the substrate is flat. Further, an attempt to reliably cut off scrap wire portions W' is likely to damage the substrate; accordingly, this operation is difficult to carry out. In view of the above, it is conventional to cut a strand of wire for each circuit after the wire has been laid in a mold, followed by transferring the laid wire(s) to the ultimate location thereof. However, this requires the additional step of transferring the wire, thereby increasing production cost, due to both the transfer step and the need for the mold.

On the other hand, in the latter method, wire W is laid directly on the substrate to which it is to be permanently attached, since it is cut for each circuit individually while being laid. However, the wire laying and cutting must be repeated for each circuit. This leads to impaired efficiency, requires a longer time to form the individual circuits, and results in poor productivity.

SUMMARY OF THE INVENTION

In view of the above problems, it is an object of the present Invention to provide a substrate, particularly for insertion in an electrical connection box, a device for cutting the wire used to form the individual circuits therein, and a method for producing the circuits from a continuous strand of wire laid directly on the substrate from its starting point to its end point. Thereafter, the strand is cut for each circuit and the scrap wire portions easily removed.

According to the Invention, there is provided a substrate on which at least one continuous strand of wire used to form individual circuits is laid, and the circuits are formed by cutting the wire in desired positions with a cutting device. The substrate comprises a wire laying portion to receive the wire and a recess which is below the wire laying plane or surface and substantially corresponds to each scrap portion of the wire to be cut off. The recess is wide enough to permit insertion of the cutters of the cutting device. Preferably, the wire is laid on the bottom surface of a wire groove and/or on the surface of the substrate between guides projecting therefrom and adapted to hold the wire in its predetermined configuration. There is provided a device for cutting the afore-described wire at at least two points to form the separate circuits. The device comprises pairs of cutters, each pair adapted to be placed at opposite ends of a scrap portion of the wire. Advantageously, the cutters each comprise a base, and first and second cutting blades projecting from the extremes of the base toward the wire. The pairs oppose each other along the longitudinal axis of the wire at an angle thereto, preferably about 90°. Desirably, the bases of each pair are substantially parallel to the axis of the wire. It has been found useful to have each pair of first and second cutting blades at opposite sides of the wire and opposed to each other. They are movable toward the wire so that one end of the scrap portion is cut by the first pair of cutting blades and the other end is cut by the second pair of cutting blades.

As a further improvement, the respective cutters each include a retainer for receiving the cut scrap portion; thus, when the cutters are closed, a space is at least partially enclosed thereby. Most desirably, the retainers project from the bottom faces of the bases toward the wire and meet when the cutters are closed. Alternatively, the device disposes of the scrap wire by the provision of a vacuum applied adjacent the cut scrap wire portion.

The wire laid substrate of the Invention is produced by arranging at least one wire in a groove on the surface of an insulation substrate, positioning the cutter blades of at least one pair of cutters on opposite sides of the wire at either end of the scrap portion to be removed, and moving the blades toward each other to cut the wire. The method also usefully includes removal of the scrap wire portion by the application of vacuum, pressure, and/or by lifting the scrap portion by means of retainers which are part of the cutters. Alternatively, the wire is laid on the surface of the substrate between guides projecting therefrom.

In a particularly desirable form of the method, there is a recess below the surface of the substrate at each scrap portion of the wire, the recess being sufficiently wide so as to permit insertion of the cutters. The cut scrap wire portion is permitted to fall down to the bottom of the recess. Due to the increased width of the recess, the cutters can be easily inserted therein, thus facilitating the cutting operation. In other words, since the floor of the recess is below the wire laying surface, the wire can be reliably cut and the scrap portion permitted to fall therein, merely by moving the pair of cutters toward each other after locating their leading ends in the recess.

BRIEF DESCRIPTION OF THE DRAWINGS

In the accompanying drawings, constituting a part hereof, and in which like reference characters indicate like parts.

FIGS. 2(A), 2(B) are sections showing the cutting of 2(C) a wire laid directly on the substrate;

FIGS. 3(A) and 3(B) are sections similar to those of FIGS. 2(A), and 2(B) showing the cutting of the wire using modified cutters;

DETAILED DESCRIPTION OF THE DRAWINGS

Figure 1A:
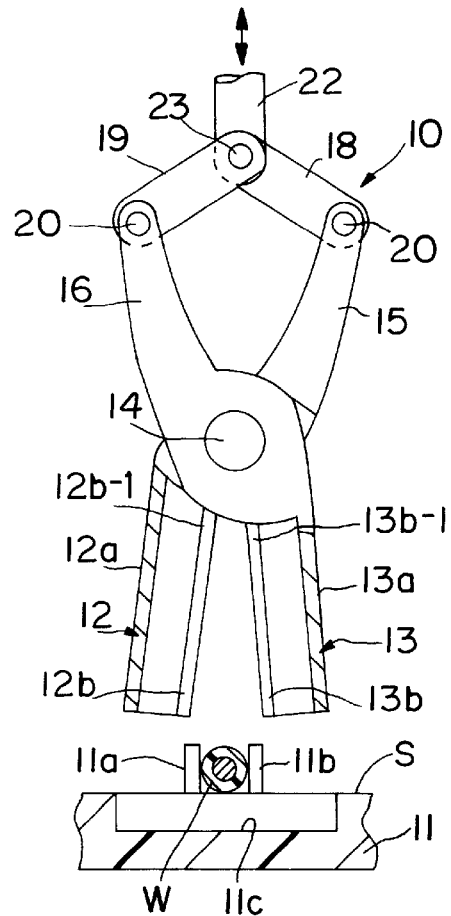
FIGS. 1(A) and 1(B) are respectively a partial section and a plan view partly in section showing a cutting device and substrate according to the Invention.
Figure 1B:
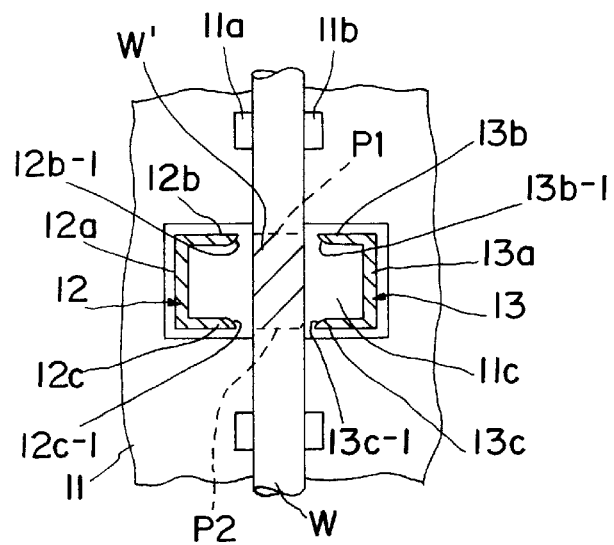

As shown in FIGS. 1(A) and 1(B), cutting device 10 cuts a continuous strand of wire W which is used to form separate circuits after it has been laid on insulation plate 11 by removing unwanted wire portions. This separates the individual circuits from each other.

Cutting device 10 includes a nipper type cutting tool. As shown in FIG. 1(A), levers 15 and 16 project from the upper ends of a pair of cutters 12 and 13, and are overlapped and pivotally connected by pin 14. Hence, the bottom ends of cutters 12 and 13 can be closed to cut the wire and opened to release the cut portions. Arms 18 and 19 are pivotally connected to the upper ends of levers 15 and 16 by pin 20. The upper ends of arms 18 and 19 are overlapped, and actuator 22 (such as a cylinder) moves pin 23 toward and away from pin 14 as indicated by the arrow, thereby causing cutters 12 and 13 to open and close.

Cutting device 10 also includes a positioning device (not shown) for holding cutters 12 and 13 at a specified height with respect to insulation plate 11. The positioning device is connected to pin 14 which pivotally connects the levers 15 and 16. By moving actuator 22 upward, levers 15 and 16 pivot toward each other in the closing direction and cut wire W from opposite sides by cutters 12, 13.

As shown in FIG. 1(B), cutters 12 and 13 include bases 12a and 13a which are substantially parallel to the longitudinal axis of wire W. First cutting blades 12b and 13b, and second cutting blades 12c and 13c, project toward wire W substantially perpendicularly to the longitudinal axis of wire W from opposite extremes of bases 12a and 13a, respectively. Accordingly, cutters 12 and 13 are U-shaped in their cross sections.

More specifically, base 12a of cutter 12 is substantially equal to the length of scrap wire portion W' to be cut off, the hatched portion of FIG. 1(B). The first and second cutting blades 12b and 12c project from the opposite ends thereof; i.e. cutting blades 12b and 12c are spaced apart by a distance corresponding to the length of scrap wire portion W'. Cutting edges 12b-1 and 12c-1 are at the distal ends of the first and second cutting blades 12b and 12c, respectively, and extend toward wire W. Correspondingly, base 13a of cutter 13 is substantially equal to the length of scrap wire portion W', and cutting edges 13b-1 and 13c-1 are formed at the distal ends of the first and second cutting blades 12b and 12c, projecting from the opposite ends of base 13a.

Cutters 12 and 13 conform to opposite ends P1 and P2 of scrap wire portion W' and, when they are closed, cutting edges 12b-1 and 13b-1, 12c-1 and 13c-1 are brought substantially into contact with each other, thereby cutting off scrap wire portion W'.

One or more pairs of guides 11a and 11b are positioned on insulation plate 11 in conformity with the layout pattern of wire W, and they retain wire W therebetween. Recess 11c below the wire laying plane or surface S of insulation plate 11 is located adjacent scrap portion W' of wire W. Recess 11c is wide enough to allow insertion of the pair of cutters 12 and 13 therein.

The desired individual circuits are produced on the substrate by laying a continuous strand of wire W on insulation plate 11 from its starting point to its end point by an automatic wire laying apparatus. Opposite sides of wire W are tightly held by guides 11a and 11b projecting from substrate 11, thus, wire W is retained on the substrate.

Subsequently, the bottom portions of the cutters 12 and 13 are inserted on opposite sides of wire W into recess 11c of substrate 11. Recess 11c is so formed as to correspond to scrap portion W' of wire W as shown in FIG. 1(B). Cutting blades 12b and 12c are opposed to cutting blades 13b and 13c with scrap wire portion W' therebetween, and are located at opposite longitudinal ends P1 and P2 of scrap wire portion W' and above recess 11c.

Subsequently, actuator 22 is moved upward; levers 15 and 16, under the influence of arms 18 and 19, pivot toward each other. This causes the pair of cutters 12 and 13 to move toward scrap wire portion W' perpendicularly to the longitudinal axis of wire portion W'. As a result, both ends P1 and P2 of scrap wire portion W' are cut from opposite sides by cutting edges 12b-1 and 13b-1 of first cutting blades 12b and 13b and by cutting edges 12c-1 and 13c-1 of second cutting blades 12c and 13c, respectively.

Subsequently, as shown in FIG. 2(C), hose 20 of a vacuum generating device (not shown) is located at recess 11c to remove cut wire portion W' from insulation plate 11. As described above, opposite ends P1 and P2 of scrap wire portion W' are cut by moving cutters 12 and 13 toward each other, thereby cutting the continuous strand of wire W and forming the desired separate circuits. Further, since insulation plate 11 is provided with recess 11c below surface S, the distal ends of cutters 12 and 13 are inserted into recess 11c and the scrap wire portion is reliably cut off. Therefore, the individual circuits can be efficiently formed.

In FIGS. 3 (A) and 3 (B), cutting device 10 includes retainers 12d and 13d at the lower ends of cutters 12 and 13. Retainers 12d and 13d project from the bottom face of bases 12a and 13a whereby a space is defined substantially by first cutting blades 12b and 13b, second cutting blades 12c and 13c, retainers 12d and 13d, and bases 12a and 13a. Scrap wire portion W' falls onto receivers 12d and 13d after having its opposite ends cut by cutters 12 and 13. Accordingly, scrap wire portion W' can be removed at the same time as cutting device 10.

Figure 4A:
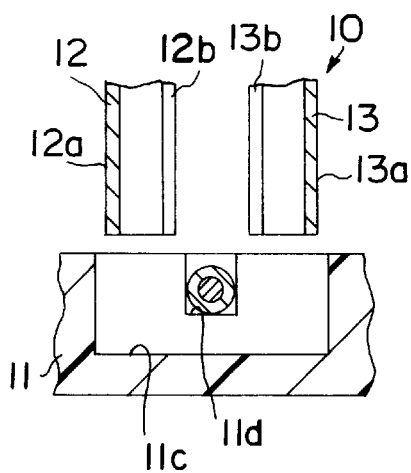
FIGS. 4(A) and 4(B) are respectively a lateral section and a plan view partly in section of a modification of the Invention.
Figure 4B:
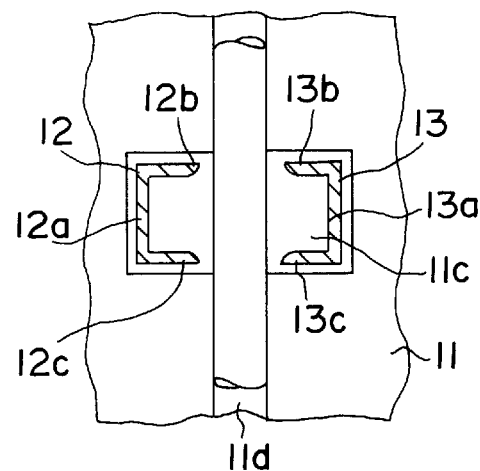
Figure 5:
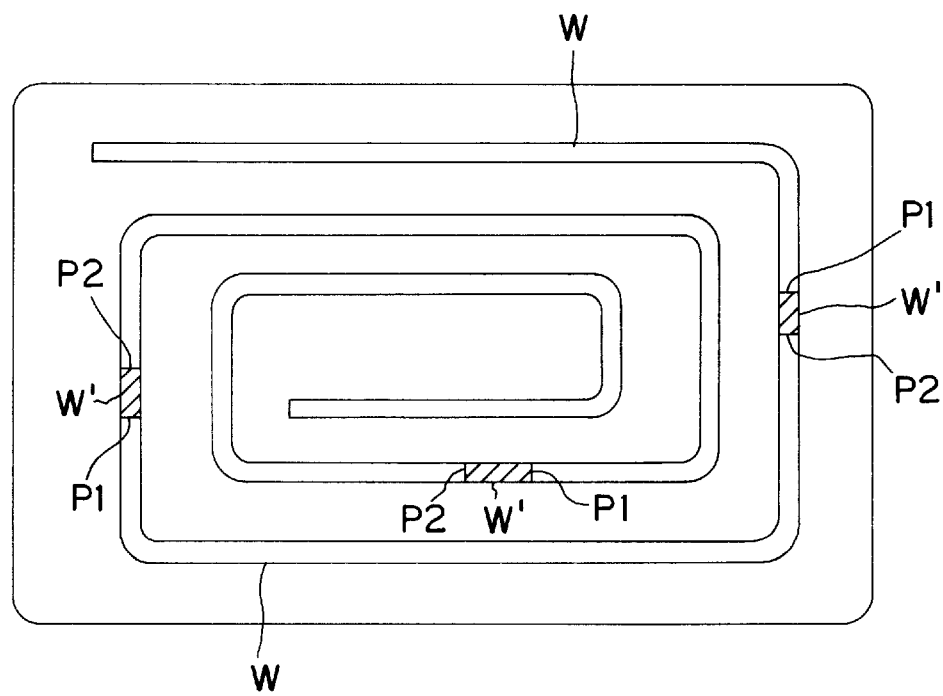
FIG. 5 is a plan view showing a device of the prior art.

Cutting devices 10 according to the Invention can be used for a wire layout pattern in which wire W, used to form individual circuits, is laid in wire groove 11d in substrate 11, and located in an electrical connection box, as shown in FIGS. 4 (A) and 4 (B).

In this electrical connection box, wire groove 11d is widened so that cutters 12 and 13 can be inserted therein. It is also deepened to form recess 11c.

The guide projections or wire laying groove are formed on or in the insulation plate in the foregoing embodiments. However, it should be appreciated that the wire may be cut to separate each circuit using the above cutting devices even if the guide projections or wire laying groove are formed on or in an upper casing or a lower casing of the electrical connection box or elsewhere.

While only certain embodiments of the present Invention have been expressly described, it is, nonetheless, to be broadly construed and not to be limited except by the character of the claims appended hereto.

What we claim is:

1. A device adapted to cut wire on a substrate having a plurality of separate electrical circuits thereon, wherein at least one continuous wire is laid on said substrate and said separate circuits are formed by cutting said wire at at least one desired location along its length, said substrate comprising a wire surface constituting a portion of said substrate surface, said wire surface being arranged in a predetermined pattern corresponding to said circuits, a recess below said wire surface at said location, a scrap portion of said wire to be cut and removed over said recess, said recess being wider than a diameter of said wire and adapted to receive a cutter on either side of said wire, said device comprising at least a first cutter and a second cutter movable toward and away from each other, said first cutter adapted for placement in said recess on one side of said wire, said second cutter adapted for placement in said recess on another side of said wire at a point opposed to said first cutter, wherein each of said first cutter and said second cutter comprises a pair of cutting blades spaced apart along a longitudinal axis of said wire a distance substantially equal to a distance between ends of said scrap portion.

2. The device of claim 1 wherein said pair of cutting blades included in said first cutter is adapted to cut said wire at one end of said scrap portion and said pair of cutting blades included in said second cutter is adapted to cut said wire at another end of said scrap portion.

3. The device of claim 1 wherein each of said first cutter and said second cutter carries a retainer extending from an end of each said cutter toward said wire whereby, when said first cutter and said second cutter are moved toward each other to cut said wire, a space is defined by said cutting blades, each said retainer, and bases which extend between each pair of cutting blades, said space adapted to receive said scrap portion.

4. The device of claim 1 comprising a source of vacuum, said vacuum being adjacent said scrap portion whereby, after said scrap portion is cut, said vacuum removes said scrap portion.

\* \* \* \* \*